July 22, 1958  J. L. JORDAN  2,844,037
ELEVATION INDICATOR
Filed June 29, 1955  3 Sheets-Sheet 1

INVENTOR
Jack L. Jordan
BY  Sidney H. Russell
ATTORNEY

July 22, 1958  J. L. JORDAN  2,844,037
ELEVATION INDICATOR

Filed June 29, 1955  3 Sheets-Sheet 2

INVENTOR
Jack L. Jordan
BY Sidney W. Russell
ATTORNEY

July 22, 1958          J. L. JORDAN          2,844,037
ELEVATION INDICATOR

Filed June 29, 1955          3 Sheets-Sheet 3

INVENTOR
Jack L. Jordan
BY *Sidney H. Russell*
ATTORNEY

United States Patent Office 2,844,037
Patented July 22, 1958

2,844,037
ELEVATION INDICATOR
Jack L. Jordan, Huntington, W. Va.

Application June 29, 1955, Serial No. 518,757

9 Claims. (Cl. 73—432)

This invention relates to a novel type of elevation determining and indicating apparatus. More particularly, my invention is directed to an instrument for measuring and recording differences in elevation which, based upon variations in the hydrostatic head of a liquid due to variations in elevation, accurately translates such variations into feet and increments of feet, such demonstrating an increase or decrease of elevation from a known point of elevation.

Known methods of surveying require a working party of several men and the use of cumbersome instruments entailing an elaborate notekeeping system. Previous apparatus employed in determining and noting differences in elevation have, to all practical purposes, been the same for many years. Consisting of a number of related and relatively large pieces of equipment, the surveying engineer is constantly faced with transporting such items from point to point in surveying any given area. Hence, the typical surveying party, as will be well understood by those skilled in this art, requires the use of such various devices as the engineer's level, a leveling rod, a field notebook in which information is recorded in rather tedious fashion and other such related equipment as the engineer's transit, the locke, the abney, the hand level, etc.

Thus, even brief reference to the ordinary method of survey and the instrumentation which is required for its accomplishment brings into focus the arduous time- and man-power consuming operations that are in common present day use. For example, the surveying is commenced at a point of known elevation or a typical bench mark, commonly established by various agencies of the Government. It is then necessary for the instrumentman to choose a point in between this bench mark and, as an example, some point uphill, the elevation of which is unknown. A rodman places the rod on the bench mark and the instrumentman then takes a rod reading. The note keeper enters this rod reading in the back sight column of his field notebook and, by adding it to the known elevation of the bench mark, determines the height of the instrument which is also recorded. The rodman then leaves the bench mark, moves ahead and selects a turning point in order that the stepping procedure may be continued. Another rod reading is then taken and recorded. By subtracting this foresight rod reading from the height of the instrument, the elevation of such turning point is determined and recorded. The instrumentman now "takes a turn" which means that he carries the instrument forward, by-passing the rodman and selects a new position for the level. The rodman remains at the turning point and the instrumentman then takes another rod reading on the rod located at the turning point. This rod reading is recorded as a backsight and, when added to the known elevation of the turning point, as earlier determined, results in a new height of instrument reading. This complicated series of operations, requiring the establishing of a horizontal plane of sight with measurements being made from it or to it, is laboriously repeated in order to finally obtain the elevation of the desired point or points.

Modifications of this basic system are used for practically all purposes where a known elevation needs to be determined or where a known elevation is to be set in the field with relation to the existing ground surface. In the case of the field engineer, this necessarily consists of numerous technical problems such as the setting of control stakes for cuts and fills pertaining to earthwork operations; the cutting of drainage ditches or the laying of underground pipe; landscaping or area grading; foundations for buildings or industrial sites; and in many other instances where elevation control is of importance.

Even such brief reference to the ordinary manner of making conventional surveys and the complex instrumentation it requires, illustrates with clarity the inherent disadvantages of such a computing and tabulating procedure. Since the entire system revolves about a group of abstract numbers, which, in this field, are referred to as rod readings, it is practically impossible to take a given elevation from a blueprint and establish it in the field or to determine the elevation of some desired point in the field without performing a series of cumbersome and transitional phases, including a series of mental and manual calculations to determine the various backsights, foresights, height of instrument readings, rod readings, and numerous intermediate elevation and time-consuming notebook entries required by such a system. Furthermore, it is at once apparent that the possibility of error is ever present. Errors can and frequently do occur in numerous ways: by the placing of a rod reading in the incorrect column of the engineer's notes or of making an error in the entry of the numerous arithmetical computations which are ever present in such a system.

Other disadvantages in known methods of survey and the apparatus which is required by a field party are equally apparent: the involved equipment is bulky and cumbersome to handle; the setting up of the level is a time-consuming operation requiring constant vigilance to assure its constant and perfect adjustment at all times; the rod must be held perfectly vertical at all times or the referred to errors in rod reading will result; and, finally, the rod must be in such a location as to be seen from the instrument at all times. The foregoing itemizes but a few of the outstanding disadvantages encountered in present methods of surveying. Such, however, culminate in an overall operation which is laboriously slow and exceedingly expensive.

My invention obviates these many disadvantages by the provision of an instrument that is compact, easy to transport, and instantaneously, visually and accurately records changes in elevation, such changes resulting from the direct ratio which exists between alterations in elevation and corresponding variations in the hydrostatic head of the liquid employed.

Accordingly, it is a primary object of my invention to provide a practical and extremely simplified instrument for accurately taking and recording differences in elevation which is extremely portable and light in weight and, therefore, can be transported and operated effectively and accurately by only one man, if necessary.

A further object of the invention is the provision of an instrument that, during its use in the taking and recording of elevations during field surveying, effectively eliminates previously required abstract rod readings, does away with the necessity of an elaborate system of note keeping, along with the possibility of error arising from such, and further eliminates the possibility of error due to incorrect rod readings.

A further objective of the invention is to provide an instrument for making surveys, the operation of which is independent of line of sight and is, therefore, suitable for ready determination of elevations of points behind obstructions.

Another object of the invention is to provide an elevation recorder that is accurate to a small degree of error and will effectively translate even comparatively minute increases or decreases in elevation, the recording instrument providing recording increments of approximately .01 of a foot.

Another advantage of my invention is the provision of a surveying apparatus that permits accuracy of operation by a single individual, the latter not necessarily being a skilled engineer.

Finally, the basic advantage of my invention is the provision of a system that, as a whole, will afford a faster, more efficient and less expensive operation than the more complex methods now in use.

Having recited the general advantages and objectives of the invention in the foregoing, reference will now be made to the drawings wherein a more detailed explanation will be found and wherein.

The following comprises a more detailed explanation of the principle involved in the use of my method and apparatus. That principle revolves about the following basic theory: that the hydrostatic pressure head of a liquid encased in a flexible tube is directly proportional to the difference in elevation of the two ends of the tube. For purposes of clarity, reference will first be made to the specific operating details of the mechanism employed to attain the objectives which have been outlined in the foregoing. This is followed by an explanation of the method of operation of my invention having reference to several simplified problems which are representative of those normally encountered in the field of surveying and which clearly illustrate the high degree of utility and flexibility of operation of the instant invention.

It is to be understood that this disclosure makes reference to only one embodiment of the invention, it being important to note that various equivalents may be used to achieve the same functions. It is the present novel combination, however, that results in a measuring and recording instrument that is susceptible of many and varied uses in the engineering field of surveying, this combination permitting rapid solution of any problem which may arise in such field without complex arithmetical calculations and without the necessity of the many known types of surveying instruments.

DESCRIPTION OF APPARATUS

Figure 1:
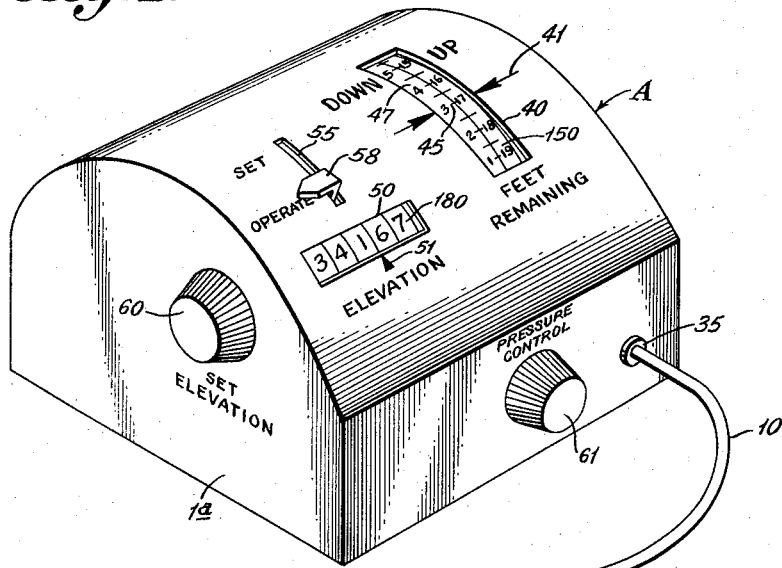
Figure 1 is a perspective view of the two casings housing the apparatus and herein designated as the head end and tail end thereof.
Figure 1:
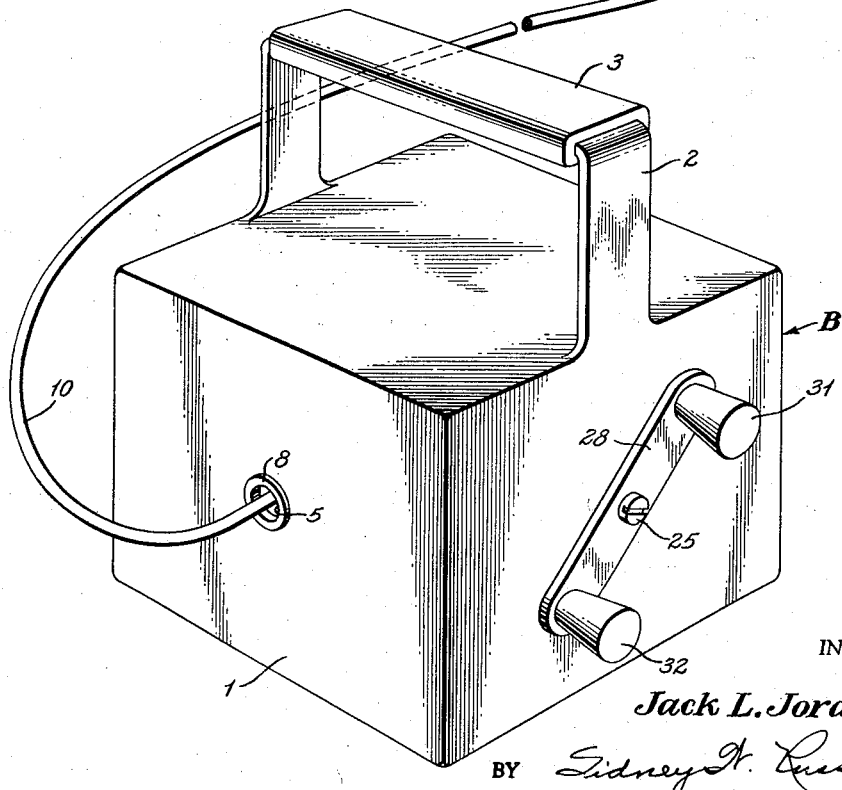

Referring to Figure 1 of the drawings, it is seen that what I prefer to designate as the "head end" and "tail end" of my surveying apparatus are indicated generally at A and B, respectively. Both of these units are enclosed in appropriate containers. Thus, container 1 encases the tail end B of the mechanism and housing 1a, the head end A. The reel upon which the flexible tubing is wound is positioned in the tail end. The pressure gauge and related indicating and recording devices are housed in the head end. Both are more particularly described hereinafter.

In the practical embodiment of this invention, these containers are relatively small, together being less than a foot in height when superimposed one upon the other. Both together can be made to weigh less than five pounds, inclusive of the weight of the mercury used in the system, mercury being herein preferred as the liquid.

The casing 1, or the container for the tail end of the mechanism, is fitted with a carrying handle 2, here shown as also being provided with a plastic or rubber grip 3. This handle is secured to the sides of the container in any well-known manner. It is of sufficient height above the top of the container to permit the head end or unit A of this mechanism to fit between the top of casing 1 and the handle 2. If necessary, suitable clips can be employed to retain the head end unit in place in this position. The result is a light, compact and portable survey instrument.

One side wall of unit B is provided with an opening 5, the latter being fitted with a grommet 8 preferably made of rubber or other similar soft material as a measure to protect the flexible tubing 10 against wear. This tubing is made of synthetic plastic, normally resistant to corrosion, and, although highly flexible, extremely durable and not subject to cracking or other deterioration. A typical material for fabrication of such tubing may be that marketed under the trade-name "Saran" which is a polyvinylidene chloride. Other comparable synthetics of like characteristics are also suitable. I have found that such tubing of the order of one-eighth inch outside diameter is of sufficient size to fulfill the requirements of my apparatus. In any event, in this embodiment of the invention, somewhat more than 100' of such tubing is employed, the latter being wound upon a spool 20, the rims of which, 18 and 19, respectively, are of sufficient size to adequately accommodate this length of tubing. The spool 20, having an axis 15 which extends slightly beyond each of the rims 18 and 19, is mounted for rotation in an obvious manner in suitable journals provided within the container 1. Secured to this axis 15 by an appropriate nut 25 or equivalent means is a handle 28 for manual winding or unwinding of the tubing upon the spool, such handle being provided with knobs 31, 32.

It is thus seen that the so-called "tail end" of the instrument is simply an anchoring point and storage place for the tubing which can be wound upon the spool in any desired length. As herein disclosed and in this, the preferred embodiment of the invention, the tubing is limited to a length of approximately 100'. It is apparent that the instrument can be made to measure longer distances and, indeed, this would simply require the addition of a sufficient amount of flexible tubing to extend the same to the desired distance. With knowledge of the present disclosure of my invention, however, such alterations thereof to accommodate greater horizontal distances would be well within the capabilities of those skilled in the art.

Figure 3:
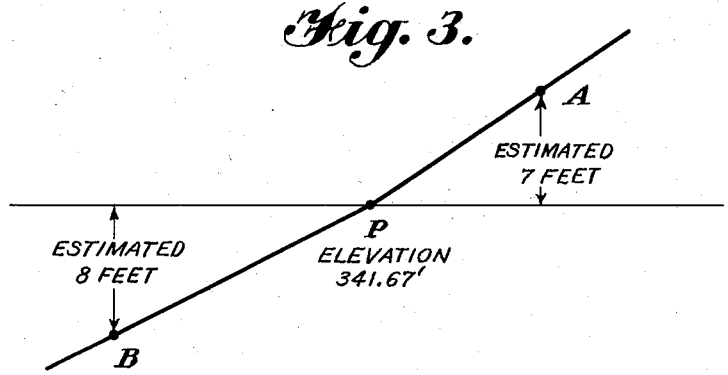
Figure 3 is a diagram illustrating use of the instrument after setting it to obtain readings with respect to either an increase or decrease in elevation.
Figure 4:
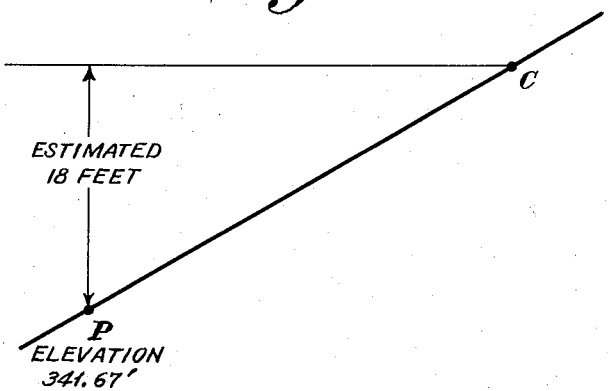
Figure 4 is a diagram illustrating the use of the instrument in taking a reading of increased elevation.
Figure 5:
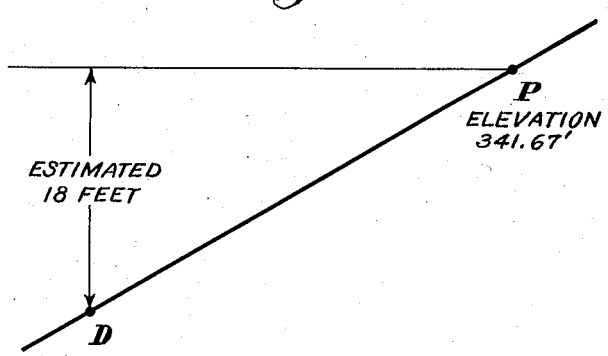
Figure 5 is a diagram explanatory of the use of the instrument in taking a reading of decreased altitude.

In Figures 3, 4 and 5, to be referred to in more detail hereinafter, it is seen that reference is primarily made to the determined differences in elevation with respect to the vertical. However, it is to be understood that a given difference in elevation may entail a substantial variation in lateral or horizontal distance from the known point of elevation. The difference in elevation between the known point and one higher or lower than that known point represents a corresponding difference of the hydrostatic head of liquid in the sensing tube, this varying hydrostatic head entailing the principle upon which the instrument is premised. It is obvious that the horizontal distances involved must necessarily vary in accordance with the different conditions encountered. However, these distances have absolutely no bearing or inference upon the head as developed by the vertical variations or differences in elevation. Hence, the only restriction that is to be placed upon the particular horizontal distance which may be involved in determining differences in elevation will be the length of the sensing tube. It is naturally desired that the tube be as long as physically possible to increase the utility of the instrument. Thus, the only limiting factors as to the length of the sensing tube revolve about certain practical considerations such as a maximum permissible bulk and the weight of the tubing, including the mercury enclosed therein, such considerations being commensurate with a light weight, portable instrument. It is thus to be understood that in this preferred embodiment of the invention, and for illustrative purposes only, the maximum range of the instrument is fixed at 20′ with a horizontal maximum range of a 100′ radius from the known point of elevation, or a 200′ diameter.

The end of the tubing which is reeled upon the spool 20 is closed at the reel end thereof by any suitable means after it has been filled and after the related apparatus to which reference will be made has also been filled with the chosen fluid. Although it is possible to have the apparatus function with other known fluids, I prefer the use of mercury. Because of its relatively heavy weight, it is ideal for use with the Bourdon type of meter, the weight of the fluid having a more immediate and responsive effect upon the movement of such a device. This closed end of the flexible tubing is, of course, secured in any usual manner to the reel 20.

The head end of the instrument is provided with a similar opening at its front, fitted with a like wear-preventing grommet 35, for reception of the tubing 10. The head end represents the related indicating and recording part of the invention. It is accordingly fitted with a glass covered slot 40 behind which is placed what I choose to term the "feet remaining indicator." The casing has midpoint markings 41 and the glass covering therefor is provided with a hair line 45. Those indicate the point where readings should be taken on the feet remaining scale, as will be explained.

As shown in Figure 1, at the upper end of the slot, the words "down" and "up" indicate the side of the dial to which the operator's attention is called in traversing the distance from a bench mark either upwardly or downwardly. Although to be expressed in more detail hereinafter, it is seen that the dial 47 is divided into two series of numbers representing one foot intervals with the opposed or pairs of numbers always totaling 20. On the side marked "up," the dial indicates (with reference to the hair line 45) the feet remaining that may be traversed by the operator in an upward direction from the bench mark or point of known elevation before reaching the capacity of the instrument. In this instance, the number of feet remaining is indicated as being 17. On the opposite side of the dial 47 the figure 3 appears opposite the number 17. This is the "down" side of the indicator and informs the operator, if he is traversing a survey downwardly, that only three feet remain before the capacity of the instrument is reached.

To the left of this indicating dial 47, an additional slot 55 is provided, the upper edge of the slot being marked "set" and the lower edge being designated "operate." This slot accommodates a lever 58 of pointed configuration upon one side thereof to clearly demonstrate its selective position with respect to either "set" or "operate."

Below lever 58 is another rectangular opening 50 in the casing 1a of the instrument. Behind this is placed a counter, here shown as having five digits. The indicating arrow 51 designates the decimal point for the feet and fractions of feet at which the counter has been set, in this instance 341.67′. This can be assumed to be the known altitude of a given bench mark and hence the last referred to indicator is marked "elevation" as being not only the startnig point for a surveying operation, but as also continuously recording an increase or decrease, in feet, of the elevation from this starting point.

In addition to lever 58, only two other external controls are necessary for operation of the unit. These are the controls marked "set elevation" represented by knob 60, and "presseure control" represented by manual control knob 61. The operation and function of these devices will be hereinafter described.

Again referring to Figure 2, is is seen that the flexible tubing 10 is shunted to an additional mechanism by way of a T-connection 70 prior to its entry into the head end assembly A. This T-connection leads the mercury line 71 into a cylinder 75 fitted with a piston 78. The latter is made to fit the cylinder within rather fine tolerance limitations. Further, all fittings are constructed to effectively seal against mercury leakage. As examples, reference is made to the T-connection 70 and the fitting of line 71 into the rear end of cylinder 75. Such mercury seals are known to the art and form no part of the invention herein. The piston 78 is in direct contact with the mercury in cylinder 75 and is employed to vary the pressure of this fluid within the system. Such piston is provided with a piston rod 80, the latter being threaded as at 81 for purposes of adjustment thereof.

The piston sits upon a mounting or frame member 85 which terminates at one end in a right-angular support 88 formed with a boss 90. The latter is tapped to receive the threads 81 of piston 80. By reference to the mechanism just described, it is seen that rotation of control knob 61 to the right (viewing Figure 2) or in a clockwise direction, will compress the fluid within the cylinder with consequent increase in pressure throughout the system. Conversely, counterclockwise rotation of manual control knob 61 decreases the pressure within the system.

Figure 2:
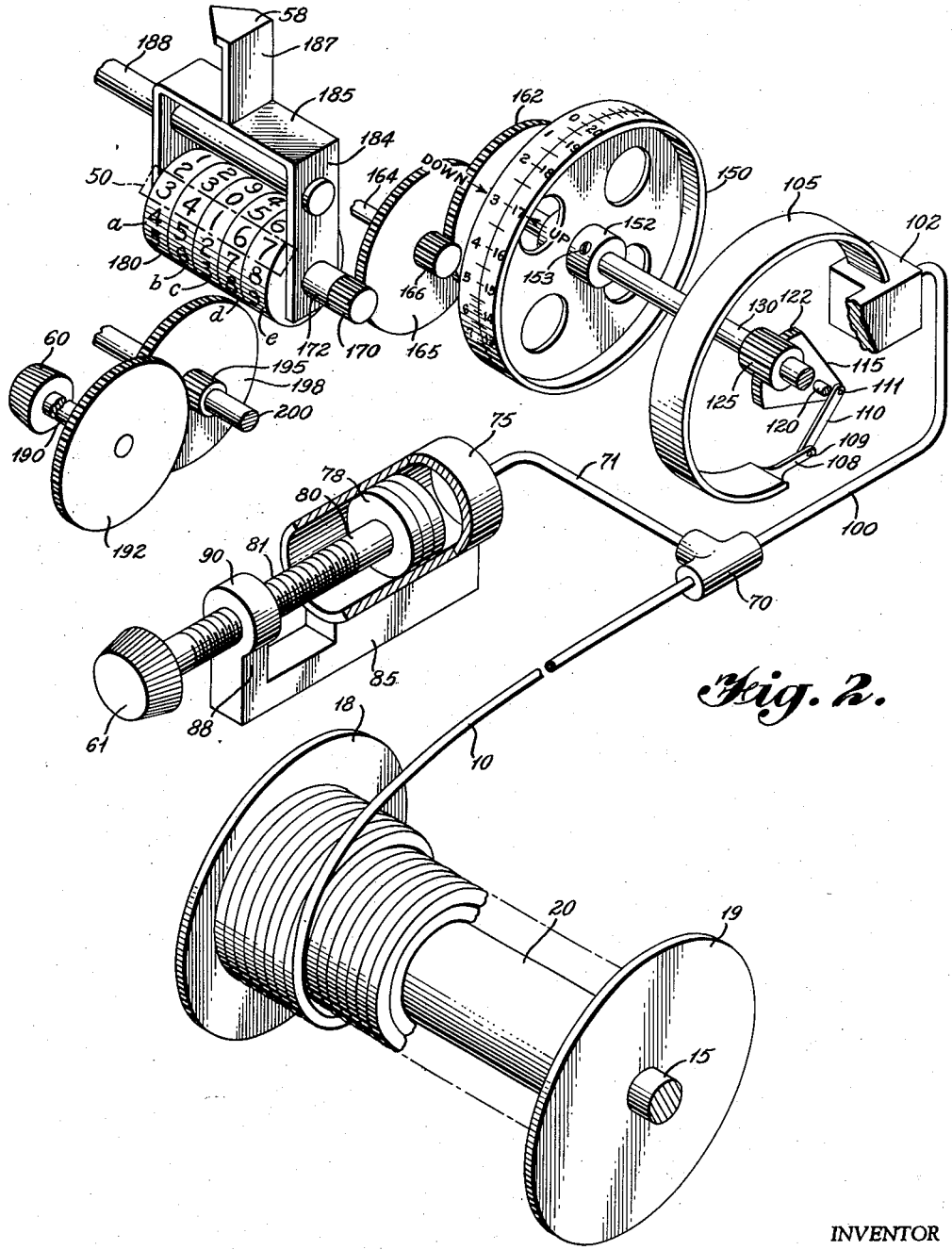
Figure 2 is a perspective view of the combination of elements housed in the head end assembly of the apparatus as well as the winding reel which is positioned in the tail end of the assembly.

Upon leaving the T-connection 70, the flexible mercury filed sensing tube, here indicated at 100, leads to the storage chamber 102 of a Bourdon tube. This is a well-known type of instrument and the description thereof found herein is confined to a typical example of such a pressure responsive device. As here shown, it is seen that the hollow Bourdon tube 105 is circular in configuration, connected to the chamber 102 at one end, closed at the other end and fitted at such other end with certain connections. Thus, link 108 is directly affixed to the sealed end of the Bourdon tube and provided with a pivot 109 for interconnection with adjacent link 110. The latter is also pivoted as at 111. The pivot 111 is affixed to a rack and pinion arrangement, the rack 115 being pivoted upon shaft 120 for rotary movement within a definite arc. The shaft 120 is affixed to the casing in any well-known manner, a specific means for doing so not being herein specifically described and not forming a part of the invention. Such is true also of the other shafts to be referred to and as shown in Figure 2, it being understood that this apparatus is depicted for purposes of explanation only, and merely with reference to its approximate positioning within the head end A. In other words, common and ordinary methods of supporting the various elements in the relative positions shown in this figure can be employed, well within the skill of the art.

The rack 115, having gear teeth 122, is adapted to engage a pinion gear 125, the latter being keyed to, or integral with, shaft 130. Thus shaft 130 translates the movement of rack 115 to corresponding movement of the indicator wheel 150. It is apparent that any increase or decrease of fluid pressure in the system will result in anticlastic bending of the Bourdon tube. Such, by reason of the described construction, will cause corresponding movement of the link 108 and a resultant movement, in direct ratio thereto, of the feet remaining indicator found upon the wheel 150.

The indicator wheel 150, provided with a substantial bushing 152, is maintained in position upon shaft 130 by means of the usual set screw 153, the set screw permitting adjustment, if adjustment is necessary, with respect to the "down" and "up" markings heretofore referred to and the hair line marking 45 which is incorporated in the glass cover plate positioned in slot 40. Here, again, the shaft 130, like the other shafts involved in this mechanical arrangement, is supported in the relative position shown in Figure 2 by suitable brackets or other media appropriately secured to the interior bottom or side walls of the container or head end A.

The shaft 130 is keyed to a large gear 162 which is designed to engage a spur gear 166 mounted upon shaft 164; such spur gear may be made integral with a similar large gear 165 and this, in turn, is adapted to engage a further small spur gear 170, the teeth of which may be directly cut upon the shaft 172. The latter shaft is in direct interconnection with a counter of known type, in this instance, the counter comprising five rotating wheels representing five digits. This counter is shown in the same position as it is illustrated in Figure 1, the reading being 341.67'. Counters of this type may be obtained from numerous sources and can be fabricated for full reversible operation. In the instant case, as will be seen, reversible operation is an obvious desideratum in order that the counter can accurately record gradual decreases in elevation.

Accordingly, the mechanism of the counter in and of itself forms no part of this invention, it being a standard article of commerce and suitable to record increments of altitude up to 999' as well as tenths and hundredths of feet. As stated, the counter herein shown consists of five rotating discs or wheels lettered *a*, *b*, *c*, *d* and *e*, respectively. It is apparent that wheel *a* measures increments in hundreds of feet; disc *b*, changes in elevation in tens of feet; and wheel *c*, changes in elevation in single feet. The decimal point appearing between counter wheels *c* and *d* measure these differences in smaller increments, namely, disc *d* indicating tenths of a foot and wheel *e* representing increases or decreases of elevation of hundreths of a foot. Since the described mechanism which effectuates rotation of these several counter wheels is extremely sensitive and accurate, it is apparent that even the slightest deviation upwardly or downwardly from the original setting of the counter, when it is placed in the operate position, will result in an instantaneous signal to the operator as to the amount of this deviation to the smallest degree.

The counter, in this preferred embodiment of the invention, is mounted upon a yoke 184 which is apertured at its lower end to accommodate the shaft 172 in rotatable fashion. The web 185 across the top of the yoke supports lever 187 which terminates in a right-angular flange or pointed tab 58, already referred to. The downwardly extending arms of the yoke 184 are each apertured (as shown in Figure 2) to receive a stationary shaft 188 suitably secured in place to the chassis of this mechanism by any common expedient. The yoke may be more or less press fitted upon the shaft 188, friction maintaining it in place when set to any predetermined setting manually. Other equivalent means may be used for retention of the yoke in the desired position. At any rate, the fit is such that the operator can readily swivel the yoke from the "set" to "operate" position, as indicated upon the exterior of casing 1a and as seen in Figure 1.

In the position shown in this figure, the yoke has been turned to the "operate" position, as stated, in which case gear 170 meshes with gear 165. When the yoke is moved to its opposite or "set" position, the gear 170 is pivoted to the left (viewing Figure 2) upon its pivot point, shaft 188. This causes engagement with a gear train assembly that permits the counter to be set to a predetermined base height or bench mark of known elevation.

Thus, a gear 198 mounted upon shaft 200 is provided with an adjacent pinion gear 195, mounted upon the same shaft. The referred to pinion, in turn, meshes with a relatively large gear 192, all for the purpose of increasing the gear ratio between the knob 60 and the shaft 172 of the counter. Such increased gear ratio permits rapid rotation of the counter upon manual, and much slower, manipulation of the knob 60 to right or left. Rotation of the knob 60 drives the remaining gear of this series, gear 192, through a shaft 190 to which gear 192 is keyed. The shafts 190 and 200 are similarly mounted within the casing or head end of the unit in the relative positions shown in Figure 1 in any suitable manner.

It is to be observed that all of the elements referred to in this arrangement, and as viewed in Figure 2, occupy the same relative positions that they will take when positioned within the head end A. Such adjustment as may be necessary to precisely fit these parts into the head end are well within the skill of the art, it being understood that Figure 2 is presented for illustrative purposes only. In any event, the gear train which is found in the series of gears, 125, 162, 165, 166 and 170, is so designed as to substantially increase the speed of the counter shaft 172. In this instance, such gears are of that size that will result in a rotation of shaft 172, 200 times to one rotation of shaft 130 or the feet remaining wheel 150. The result will be that the pressure variations as transmitted from the pressure gauge can be read as .01 variations of feet in elevation from the counter 180. Thus, with a five digit mechanical rotation counter, such as herein illustrated, a one-tenth revolution of shaft 172 results in the change of one numeral on the counter. In this instance, the numeral 7 appears on the right end counter wheel *e*. Assuming the elevation to be increasing, such one-tenth revolution of shaft 172 would thus indicate change in elevation of .01', the counter then reading .68 to the right of the decimal point. In similar manner, one complete revolution of shaft 172 will result in ten numeral changes of counter wheel *e* and likewise one numeral change on counter wheel *d*. Likewise, ten revolutions of the counter shaft 172 results in one numeral change in counter wheel *b*, whereas one hundred revolutions of the counter shaft are necessary to effect one numeral change of counter wheel *a*. The referred to counter wheels, as stated, are of such construction as to indicate the rotation of shaft 172 in either a positive or negative direction, adding for positive and subtracting for negative. As here employed, the positive would have reference to increasing elevations and the negative, reference to decreasing elevations.

As will be seen, such a mechanical arrangement permits a direct reading from the Bourdon tube, translated into feet and increments of feet. It also permits, by use of the described clutching arrangement, quick setting of the counter and a simple manner of interconnection of the counter to operating position with the gear train.

In the foregoing, reference has been made to a gear train which results in a 200 to 1 ratio, thus permitting .01 variations of feet in elevation to be read from the counter. It is to be understood that this ratio is suggested herein for purposes of illustration only; such is not necessarily a fixed 200 to 1 ratio or any other definite ratio, various circumstances dictating the most desirable ratio for the type of operation desired. For example, a 200 to 1 ratio would be applicable, as in this description of one embodiment of the invention, when a Bourdon tube having a 20' range is interconnected with the conventional 10 unit counter. Thus in the example illustrated in Figure 2, a 20' hydrostatic head of mercury in the sensing tube results in one complete revolution of the shaft 130. Such one revolution of this shaft is then amplified through the gear train to cause 200 revolutions of shaft 172 which is, in turn, indicated on the counter as 20'. On the other hand, it may be decided to sacrifice part of the range of the instrument to obtain an increased sensitivity thereof. As another possible variation, this can be accomplished by replacing the 20' Bourdon tube with a 10' Bourdon tube. The result will be that a 10' hydrostatic head causes one complete revolution of shaft 130. In this instance, the gear ratio must be modified accordingly in order that one revolution of the shaft 130 causes only 100 revolutions of shaft 172 in order for the 10' head to be indicated as a change of 10' on the counter. Hence, the gear ratio spoken of in the foregoing must be considered as a representative but flexible construction for Bourdon tubes of varied ranges may be utilized if properly geared to the counter to convert variations in pressure to corresponding variations in elevation. Such alterations in the invention as herein disclosed, encompassing the use of different gear ratios and of Bourbon tubes of varying significance, comprise changes well within the ordinary skill of the art and depend solely upon the character of use desired for the instrument.

Besides this function of permitting a quick setting of the counter, the clutching arrangement which has been described in the foregoing entails a second important function. This involves disengagement of the counter wheels from the gear train to permit the elevation indicated on the counter to remain undisturbed during movement of the tail end of the instrument to a new location or in other words, in the parlance of surveying, during the course of "taking a turn." If the assumption is made, as explained above, that the instrument is equipped with a 100' sensing tube and a Bourdon tube capable of indicating 20' of mercury, then it is apparent that its operating limitations are represented by these distances. Obviously an instrument with this limited range would be practically useless during construction of a dam or highway covering many square miles in area and varying in hundreds of feet in elevation unless suitable means are provided for conveying a known elevation from one part of this area to another. Thus, provision is made in this invention, by reason of the described clutch means, for accomplishing this important function. In other words, once the known elevation has been determined and recorded on the counter by the instrument, disengagement of the clutch from the feet remaining indicator gear train permits the counter to remain in that set position, whereupon the instrument can be carried over long distances, either vertically or horizontally, with that known elevation retained on the counter for use in the next step in the surveying procedure. Thus, the overall scope of the instrument is increased to where it can be conveniently used on large surveys as well as on proportionately smaller ones.

METHOD OF OPERATION

As stated, in the embodiment herein described, the vertical range of the instrument is 20'. Such range can bebe increased to accommodate the conditions which may be encountered in the field by a corresponding increase in the range of the pressure gauge. Since the range is here said to be 20', it is to be understood that the gauge is of sufficient range to indicate variations between 0" and 240" of mercury, 240" of the liquid being, of course, equal to 20'. With knowledge of the present disclosure of my invention, however, such alterations thereof to accommodate either greater or lesser vertical distances would be well within the capabilities of those skilled in the art.

Infinite variations are possible in the use of this invention. Thus, the head end may be lowered 20' below the tail end before reaching maximum, permissible pressure on the Bourdon tube; or enough pressure may be manually imposed into the sensing tube 10 by use of the pressure piston 78 to permit the head end to be raised 20' above the tail end before reaching minimum pressure; or beginning with the head end and the tail end level with respect to each other, the head end may be lowered 10' before reaching maximum pressure; or raised 10' before reaching minimum pressure; or the system can be used in any combination of these conditions within a 20' limit.

Reference has already been made to the circular indicator wheel 150 about the periphery of which a dial 47, comprised of two sections, is graduated, with respect to both sections, in scales of feet from 0 to 20. One scale is numbered in a clockwise direction (viewing Figure 1, the right-hand scale) and the other in a counterclockwise direction, the indexes in relation to which the numerals shown on the dial or scale 47 may be observed by the operator. The right-hand scale is marked "up" and the left-hand scale being marked "down."

It will thus be seen that when maximum pressure is applied to the Bourdon tube, the numeral 0 would be observed on the down side of the scale opposite the indicating arrows 41 and the up side of the scale would show the numeral 20. This immediately indicates to the operator that the instrument can be raised as much as 20' (or there are "20' remaining" to traverse an upward distance) but cannot be further lowered without first taking a turn as the indicator shows 0' remaining on the down side of the scale. The opposite condition prevails under situations of minimum pressure in which instance 0 would be observed on the "up" side of the scale and 20 on the "down" side.

In this manner, a visual indicator is provided which enables the operator to observe at all times the existing relative position of the instrument with respect to its maximum, allowable, vertical position. In much the same manner, the instrumentman, conducting the usual type of field survey, observes the general location of the rod.

Reference will now be made to Figures 3, 4 and 5 of the drawings which illustrate several typical situations where my invention can be used to accomplish quick and accurate surveys, with respect to the vertical distance of an unknown point above or below a known point of elevation.

In considering these examples, it is to be understood that the system of my invention is extremely flexible due, inter alia, to the inclusion in it of a mechanism which can create an artificial head. In other words, through compression of the liquid in the sensing tube by the means which have been described, an artificial pressure head is established which is in addition to the normal head created by the difference in elevation between the head end and tail end of the instrument. Thus assuming the head end to be at a point 10' below the tail end, a resulting 10' indication of head will be indicated by the instrument. By adjustment of the pressure piston, an additional pressure of 10' can be manually superimposed in the sensing tube 10. A total pressure equivalent to an elevation of 20' will then be present in the sensing tube. Thus, when the head end is then raised 10' to a position level with the tail end, a pressure drop of 10' occurs and, accordingly, an increase of 10' in elevation is indicated by the instrument. However, the artificial head of 10' still remains in the sensing tube and, therefore, under these conditions, the head end can be elevated to a position 10' above the tail end before the decrease in pressure will fail to indicate a corresponding increase in elevation on the dial of the instrument.

It is the principle of operation of the invention just recited that is made the basis of the first of the following examples.

Example 1

Commencing first with Figure 3, it is seen that a known point of elevation P, such as a bench mark, has an elevation of 341.67. The problem is to determine the elevation of both points A and B, point A representing a point of increased elevation and point B representing a point of decreased elevation. In this instance, since the elevation of both points A and B are to be determined with one setting of the instrument, it is apparent that such unknowns must be within 10' of the known point of elevation, the capacity of the instrument being, as stated, 20'.

In solving this problem, the tail end B of the instrument is placed somewhere in the vicinity of point P. The head end A is positioned directly upon point P. The selector lever 58 is then placed in the set position resulting in disengagement of shaft 172 with its associated gear train, and engagement of that shaft with the gear train interconnected with the manual control knob 60. By manual rotation of the "set elevation" knob, the counter wheels, due to the gear ratio of this gear train, are rapidly rotated to the figure representing the known elevation—341.67, this operation being observed through the window 50 of the head end of the instrument. The nature of the problem is such that it is necessary to both raise and lower the head end from the initial starting point of P while leaving the tail end stationary throughout the problem. Thus, while the selector lever 58 is in the set position, the pressure control knob 61 is turned right or left while at the same time observing the feet remaining indicator and the dial 47. In this manner, the initial pressure within the system is manually adjusted until the dial 47 at the hair line 45 is read 10' up and 10' down. In so doing, the desired operating range of the instrument for this specific occasion is properly selected.

The selector lever 58 is now changed from the set position to the operate position, this setting causing the spur gear 170 of the counter to be engaged with the gear train interconnected with the Bourdon tube. Such setting is accomplished manually by rotation of the yoke about the axis 188 hereinbefore referred to. With the counter so interconnected with the Bourdon tube, it is apparent that any change in pressure within the system due to the raising or lowering of the head end will be indicated by the pressure gauge 105 transmitted through the extended shaft 130 and gear train consisting of gears 162, 165, 166 and 170, with resultant indication in change of elevation on the series of counter wheels. It is to be observed that at no time during the actual operation of the instrument is the pressure within the system manually adjusted; this is only done when the selector lever is in the set position.

Continuing with the solution to the stated problem, it is seen that if the head end is raised from point P to point A, the Bourdon tube 105 detects a reduction in internal pressure due to the changing head of mercury between the head end and the tail end, it being important to note that the variation in pressure is always considered with respect to its influence upon the head end of the instrument. Hence, the initial pressure which was imposed into the system indicated on the feet remaining indicator as 10' on the up side is now decreasing with elevation of the head end and the indicated elevation is increasing.

Upon reaching point A, its elevation may be read directly from the counter wheels of the counter and the feet remaining scale on the up side indicates 3' remaining, demonstrating that the head end could be continued upwardly an additional 3' had it been necessary before reaching the limit of minimum operating pressure in the system. Assuming the difference in elevation of point A to be exactly 7', the counter will now read 348.67'.

It is now necessary to determine the elevation of point B to solve the stated problem. The tail end remains in its original position and the head end is lowered to determine the elevation of point B. During such lowering, the pressure responsive member detects an increase of pressure within the system and this is indicated by a decrease in elevation on the counter wheels and a corresponding decrease of the feet remaining indicated on dial 47. Point B is also reached before a point of maximum operating pressure within the system (indicated as 0 on the scale) is obtained. Thus, when point B is reached, and assuming the difference to be exactly 8', the counter will now read 333.67', with the feet remaining indicator showing 2' on the "down" side of the scale 47.

*Example II*

Reference is here made to Figure 4 where it is to be appreciated that the problem is somewhat simpler, involving measurement of a given distance upwardly only from point P, the latter still representing a point of known elevation of 341.67'. It is desired that the elevation of point C be determined which has been estimated at being less than 20'.

In this instance, the tail end of the instrument is placed in the vicinity of point P. Knowing the course of travel is to be all uphill, the operator places the head end A upon the point of known elevation, point P, adjusts the selector lever to the set position and enters the known elevation into the counter wheels by manually rotating the set elevation knob 60. By then rotating the pressure knob to compress the mercury in the system, a maximum pressure is built-up therein and observed by the approach of the marking 20 on the up side of the feet remaining scale. The selector lever 58 is then placed in the opposite, or "operate," position. It is now apparent that the head end of the instrument can be raised 20' above the tail end before the pressure within the system is depleted. Here, again, depletion of such pressure is indicated by the figure 0 on the "up" side of the feet remaining indicator.

After setting the instrument in this fashion, the operator will reach point C carrying the head end with him, the resulting traverse upwardly reducing the pressure in the system so that the distance on the feet remaining scale on the up side (if the distance traversed is exactly 18') would read 2'. Having locked the counter into the pressure responsive system, the counter will then read 359.67 or an increase in altitude over the known point of elevation of 18'.

*Example III*

Figure 5 represents a problem where the traverse is downhill an estimated 18' from the point of known elevation to point D. Again, the elevation of point P is set on the counter of the instrument and the pressure in the system reduced to an absolute minimum by manual adjustment of pressure knob 61. This minimum is indicated when 20' appears on the dial 47 of the feet remaining indicator on the "down" side thereof. Selector lever 58 is then placed in the "operate" position, the instrument now being so adjusted that the head end can be lowered 20' before a point of maximum pressure is reached. Such point of maximum pressure would be indicated by the numeral 0 on the down side of the feet remaining indicator.

The operator then traverses the distance to point D, taking the head end of the instrument with him. Upon reaching point D (assuming it to be exactly 18), 2' will show upon the dial 47 on the down side thereof indicating a decrease in altitude of 18'. This decrease will be reflected by the counter wheels which will now record 323.67'.

It should be observed that in instances where the desired elevation can not be reached without exceeding the limits of the Bourdon tube as observed from the feet remaining indicator, or without exceeding the distance as permitted by the length of the sensing tube, the last point which can be reached is treated as a point of known elevation in that its elevation has been determined by use of the instrument. The head end is permitted to remain stationary at that point, and the selector lever placed in the "set" position to permit the predetermined elevation of the point to remain in the counter wheel. This is done since the set elevation knob 60 is not disturbed during this operation. The operator then carries the tail end ahead while the head end remains stationary. After the tail end is located in a desirable position, pressure within the system is adjusted to suit the conditions of the problem by means of the pressure knob 61 and by observing the reading of the feet remaining indicator. The selector lever is then placed in the operate position. In that the elevation as indicated on the counter wheels has not been disturbed, it is unnecessary to fit any elevation into the instrument and the operator is thus prepared to continue with the operation.

For purposes of simplicity only, whole numbers have been used in the foregoing. It is obvious, however, that tenths and hundredths of feet may likewise be recorded on the counter as fractions of the differences in elevation from the base point either upwardly or downwardly.

It should also be apparent that any possible combination of the problems as presented in the stated examples can be satisfactorily dealt with by proper use of the invention. The pressure piston enables the operator to select the range of the instrument while the selector lever is in the set position. Thus the instrument can be set for a maximum number of feet on the "up" side of the dial 47, a minimum number of feet as indicated by the "down" side of the dial, or half "up" and half "down," or at any point in between these ranges. It is thus apparent that the operating range of the instrument is effectively increased to that of the Bourdon tube, while at the same time the all important sensitivity of the Bourdon tube is not impaired.

While the invention has been described with reference to one embodiment only, it will be apparent to those skilled in the art that numerous changes and modifications may be made without departing from its principle or from the essential features of the combination disclosed. Accordingly, the scope of the invention is to be limited only to the degree indicated in the appended claims.

I claim:

1. In a portable surveying instrument, a closed system apparatus utilizing the pressure of a liquid within a flexible tube to measure differences in elevation from a known point, a Bourdon tube connected with said tube, a shaft, said Bourdon tube being arranged to drive said shaft, a feet remaining indicator connected with said shaft, means to adjust and preset the pressure within said tube and said Bourdon tube to a predetermined degree thereby creating an artificial head within said system, a counter geared to said indicator, and clutch means between said counter and indicator permitting adjustment of said counter independently of said closed system, whereby alterations in pressure within said Bourdon tube due to variations in elevation are recorded as changes in elevation on said counter and said indicator continually records the capacity of the instrument with respect to further traverse thereof from said known point.

2. In a portable surveying instrument, a closed system apparatus utilizing the pressure of a liquid within a flexible tube to measure differences in elevation from a known point, a pressure responsive member in interconnection with said tube at one end thereof, a spool, the other end of said tube being attached to said spool whereby said tube may be reeled thereon, a feet remaining indicator connected with said member, said feet remaining indicator comprising a wheel adapted to be rotated by said member, the periphery of said wheel having a scale comprised of opposed pairs of numbers, each of said pairs totaling the same number, one side of said scale being numbered in sequence, the opposite side of said scale being numbered in a reverse sequence, a counter geared to said indicator, a clutch means between said counter and said indicator permitting independent and selective adjustment of said counter to record known points of elevation whereby alterations in pressure within said member due to variations in elevation are indicated as feet remaining on said scale, said counter being adapted to record said variations as increased or decreased elevations in feet and fractions of feet.

3. In a portable surveying instrument comprising a closed pressure system utilizing the pressure of a liquid within a flexible tube to measure the elevation of a point from a point of known elevation, a Bourdon tube connected with said flexible tube, means to adjust the pressure within said flexible tube, a feet remaining indicator operatively associated with said Bourdon tube, a gear reduction transmission in interconnection with said indicator, said feet remaining indicator being scaled to evidence the remaining capacity of the instrument as the instrument is moved up or down with respect to said point of known elevation, a counter shaft driving a counter geared to said transmission and adapted to rotate a predetermined number of times to one rotation of said indicator, and a clutch means selectively interconnecting said counter and said indicator permitting adjustment of said counter independently of said closed pressure system whereby alterations in pressure within said Bourdon tube due to variations in elevation are recorded on said counter as increased or decreased elevations.

4. In a surveying instrument adapted to automatically record a decrease or increase in elevation from a known point of elevation, and comprising a closed pressure system, said system including means to translate increases and decreases in pressure into increases and decreases of elevation measured in feet and fractions of feet, said means comprising a winding spool, a fluid filled tubing adapted to be wound upon said spool and affixed to said spool at one end thereof, a pressure piston means in interconnection with said tubing, means to reciprocate said piston to increase and decrease fluid pressure within said tubing whereby an artificial pressure head may be maintained throughout said system, a fluid pressure responsive member at the opposite end of said tubing, a wheel in interconnection with said member and adapted to be rotated by the pressure responsive movement of said member, a gear train engaging said wheel upon one side thereof, a counter assembly, said gear train engaging said counter assembly at the other side thereof, manual adjustment means for said counter and clutch means to selectively engage said counter with said gear train and said adjustment means, whereby said counter can be set selectively and independently of said pressure system to a predetermined elevation and engaged with said member through said gear train to record in feet the increases and decreases in elevation as responded to by said member.

5. In a surveying instrument adapted to automatically record increases and decreases from a known point of elevation and comprising a closed pressure system, said system including means to translate increases and decreases in pressure into increases and decreases of elevation measured in feet and fractions of feet comprising a winding spool, a fluid filled tubing adapted to be wound upon said spool and affixed to said spool at one end thereof, a pressure piston means in interconnection with said tubing, means to reciprocate said piston to increase and decrease fluid pressure within said tubing to create an artificial pressure head within said system, a pressure responsive member at the opposite end of said tubing, a wheel in interconnection with said member and adapted to be rotated by pressure responsive movement of said member, a scale on the periphery of said wheel having a series of pairs of numbers representing feet and fractions of feet, each of said pairs having numbers totaling twenty feet, a gear train engaging said wheel upon one side thereof, a counter assembly, said gear train engaging said counter assembly at the other side thereof, manual adjustment means for said counter and clutch means to selectively engage said counter with said gear train and said adjustment means, whereby said counter can be set to a predetermined elevation and engaged with said member through said gear train to record in feet the increases and decreases in elevation as responded to by said member.

6. In a surveying instrument, a closed pressure system adapted to automatically record upward and downward changes in elevation from a known point of elevation, said system including means to translate increases and decreases in pressure into increases and decreases of elevation measured in feet and fractions of feet comprising a winding spool, a fluid filled sensing tube adapted to be wound upon said spool and affixed to said spool at one end thereof, means to increase and decrease fluid pressure within said tube to create an artificial predetermined pressure head in said system, a Bourdon tube at the opposite end of said sensing tube, a wheel in interconnection with said Bourdon tube and adapted to be rotated by pressure responsive movement of said Bourdon tube, a scale on the periphery of said wheel having a series of pairs of numbers representing feet and fractions of feet, said scale indicating the feet remaining before said instrument reaches its capacity in any operation determining vertical elevation above or below a known point of elevation, a gear train engaging said wheel upon one side thereof, a countershaft and counter, said gear train engaging said countershaft at the other side thereof, said countershaft rotating a plurality of times per single rotation of said wheel, manual adjustment means for said counter and clutch means to selectively engage said counter with said gear train and said adjustment means, whereby said counter can be set to a predetermined elevation and then engaged with said Bourdon tube through said gear train to record in feet the increases and decreases in elevation as responded to by said Bourdon tube.

7. In a portable surveying instrument utilizing a closed system and the pressure of a liquid within a flexible tube to automatically measure differences in elevation from a known point, means to induce an artificial pressure head within said system, a fluid pressure responsive member connected with said tube, a feet remaining indicator having a driving gear and being connected with said member, a numerical counter having a spur gear adapted for geared engagement with said driving gear, a manual setting control for said counter, and a clutch mechanism for selectively interconnecting said counter with said control and said indicator independently of said closed system, said clutch mechanism including a pivoted mounting for said counter, whereby said spur gear can be pivoted in and out of engagement with said driving gear.

8. In a portable surveying instrument utilizing the pressure of a liquid within a flexible tube to automatically measure and record differences in elevation from a known point, a fluid pressure responsible member in interconnection with said tube and responsive to pressure of fluid therein, a feet remaining indicator rotated by said member, a gear train actuated by said indicator, a numerical counter having a spur gear adapted for geared engagement with said gear train, a manual setting control for said counter, said control having a gear transmission, and a clutch mechanism for selectively interconnecting said counter with said control and said indicator, said clutch mechanism including a pivoted mounting for said counter, whereby said counter and said spur gear may be selectively pivoted to a position in engagement with said gear train for response to movement of said indicator, and to a position in engagement with said transmission for response to movement of said manual setting control.

9. In a portable surveying instrument utilizing a closed system and the pressure of mercury within a flexible tube to measure differences in elevation from a known point, a fluid pressure responsive member in interconnection with said tube responsive to pressure of mercury therein, a feet remaining indicator rotated by said gauge, a pressure piston means in interconnection with said tubing whereby pressure therein may be adjusted and said indicator accordingly preset, a gear train actuated by said fluid pressure responsive member, a numerical counter having a spur gear adapted for geared engagement with said gear train whereby said spur gear rotates a plurality of times per single rotation of said indicator, a manual setting control for said counter, said control having a gear transmission and a clutch mechanism for selectively interconnecting said counter with said control and said indicator, said clutch mechanism including a pivoted mounting for said counter, whereby said counter and said spur gear may be selectively pivoted to a position in engagement with said gear train for response to movement of said indicator, and independently of said closed system to a position in engagement with said transmission for response to movement of said manual setting control.

References Cited in the file of this patent

UNITED STATES PATENTS

| 723,040 | Schmitz | Mar. 17, 1903 |
| 2,557,021 | Williams | June 12, 1951 |
| 2,604,117 | Angst | July 22, 1952 |
| 2,672,758 | Hibbard | Mar. 23, 1954 |

FOREIGN PATENTS

| 12,002 | Great Britain | Apr. 17, 1902 |
| 506,054 | France | May 21, 1920 |
| 506,793 | Germany | Sept. 12, 1930 |

OTHER REFERENCES

Geophysics, vol. XVI, #3, Crumrine et al., pages 486–493, July 1951.